Patented May 13, 1924.

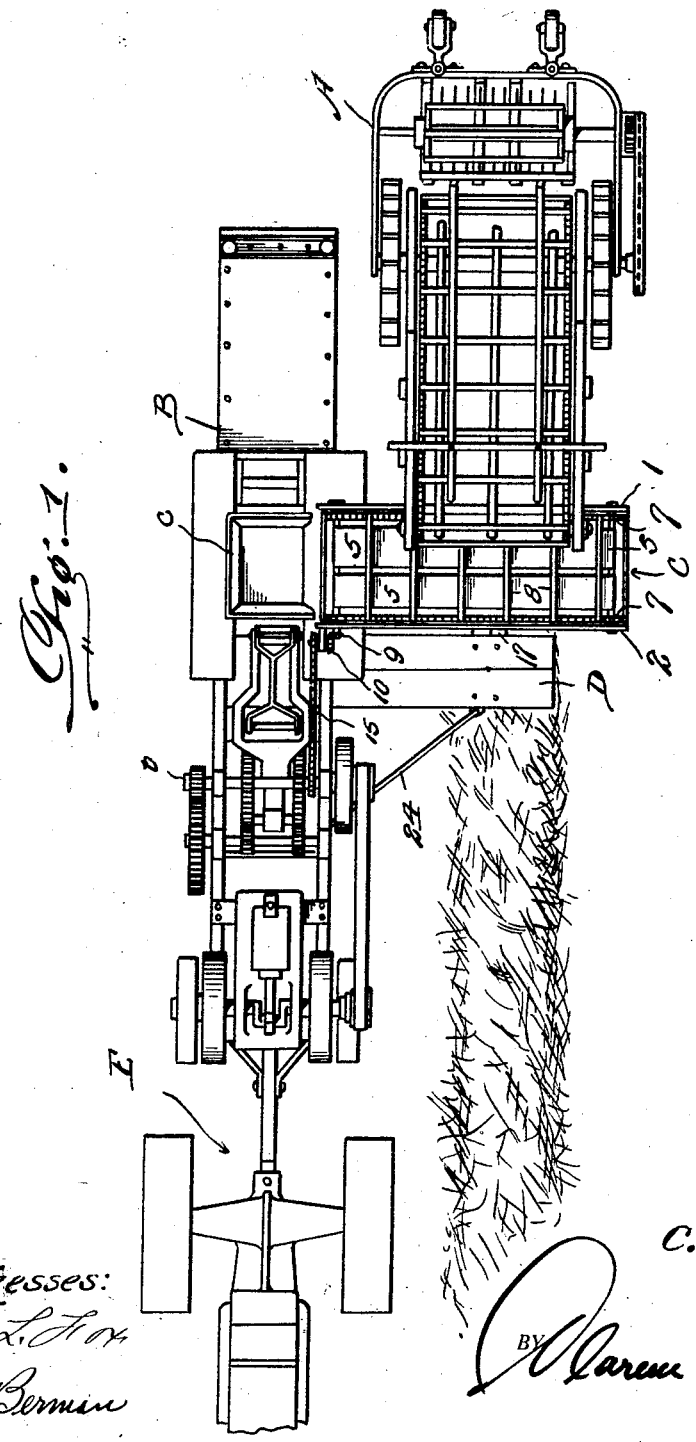

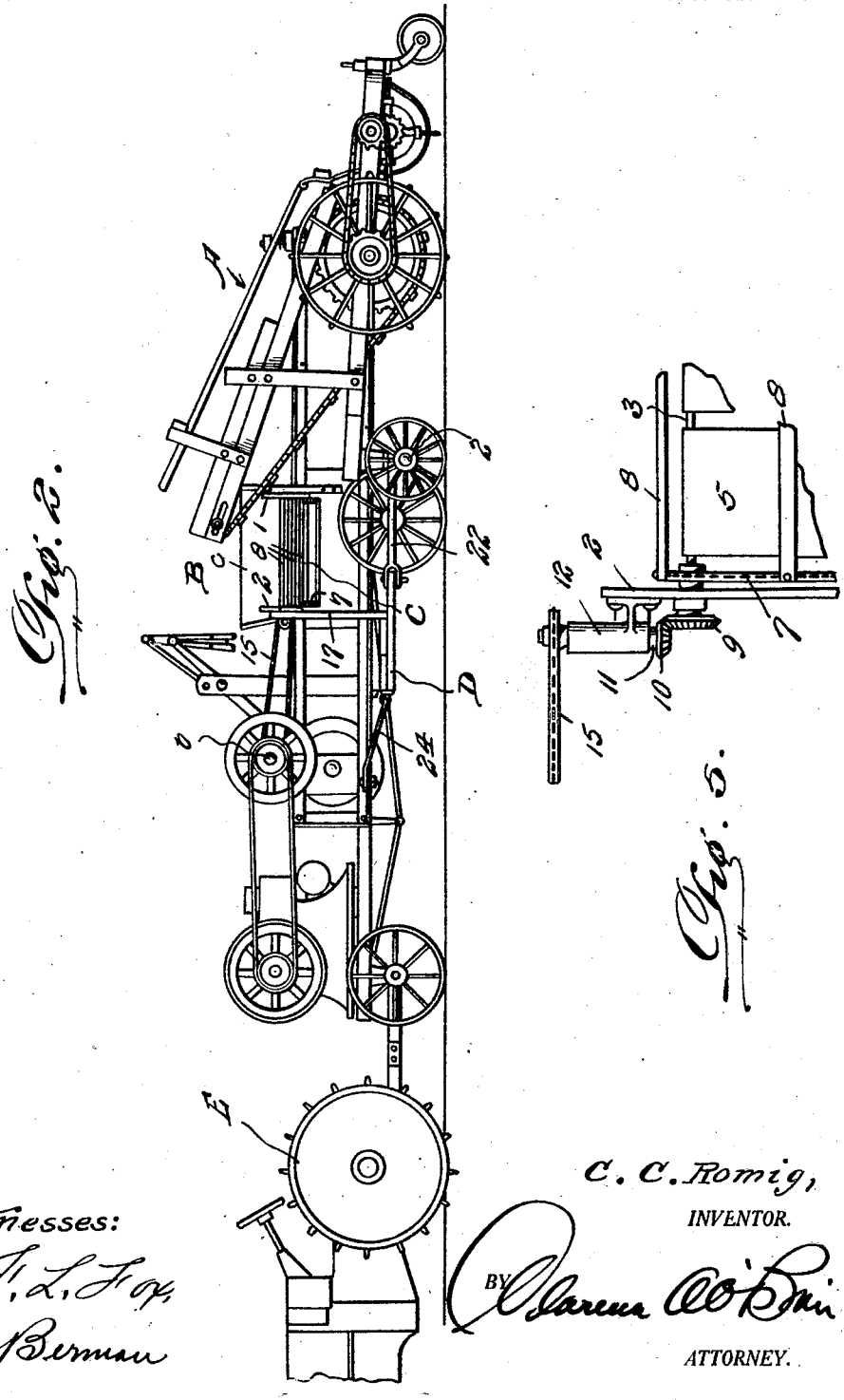

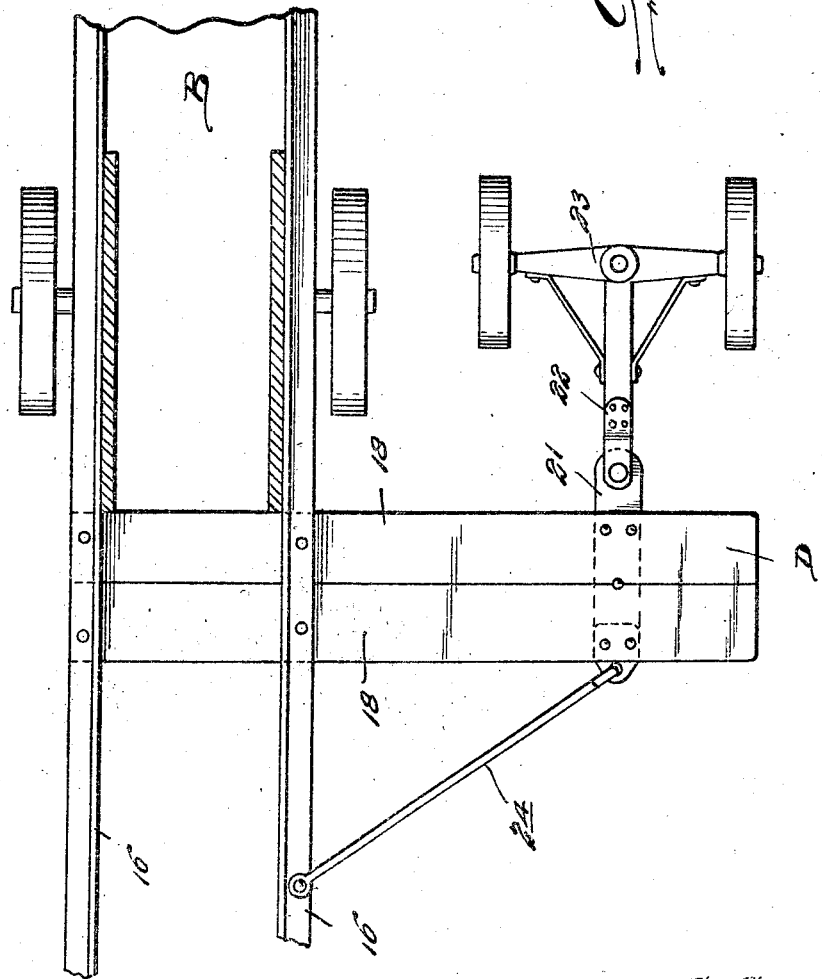

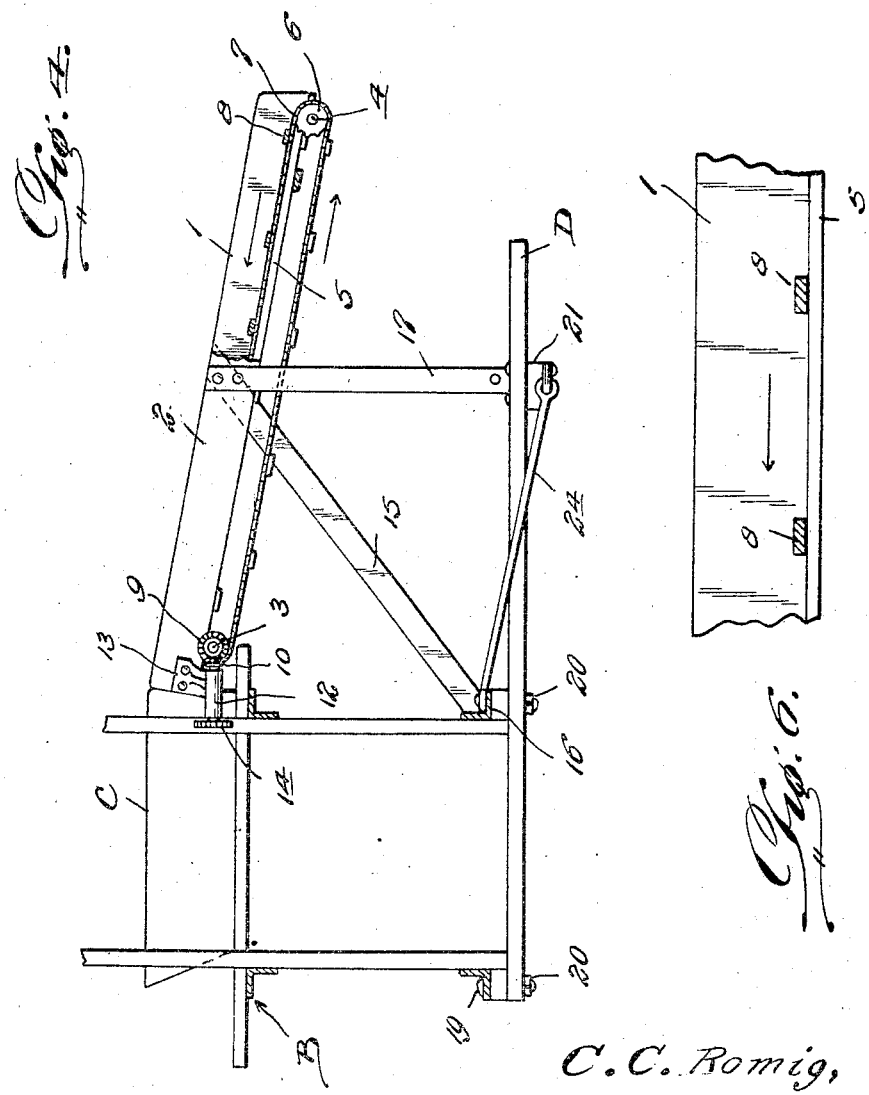

1,494,024

UNITED STATES PATENT OFFICE.

CHARLES C. ROMIG, OF INDEPENDENCE, KANSAS.

HAY LOADER.

Application filed October 26, 1922. Serial No. 597,146.

*To all whom it may concern:*

Be it known that I, CHARLES C. ROMIG, a citizen of the United States, residing at Independence, in the county of Montgomery and State of Kansas, have invented certain new and useful Improvements in Hay Loaders, of which the following is a specification.

The primary object of the present invention resides in the provision of any conventional form of hay baler and hay loader suitably joined together whereby the baler and loader may be connected to a tractor for picking up the hay from the windrow and transferring it to the baler in a simple and expeditious manner, suitable means being provided between the loader and the baler for conveying the hay to the baler.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 1 is a top plan view of the machine disclosing the loader in alinement with a hay windrow and also showing the forward end of the machine connected to a tractor.

Figure 2 is a side elevational view of the machine.

Figure 3 is an enlarged fragmentary sectional view through the frame of the baler disclosing a supporting platform secured thereto for supporting an attendant of the machine thereon.

Figure 4 is an enlarged front elevational view of a conveyor suitably supported upon the frame of the baler and the platform for conveying the loader to the baler.

Figure 5 is a fragmentary top plan view of one end of the conveyor showing a means for driving the same from the baler mechanism, and Figure 6 is an enlarged fragmentary cross sectional view of a portion of the conveyor shown in Figure 4.

Briefly described, the invention contemplates the provision of any conventional form of hay loader having spaced connections to one side of a conventional form of hay baler and having means supported upon the side of the baler for conveying the hay from the loader, to the hopper of the baler, whereby the hay that is raked up by the loader as it passes along the windrow is suitably baled in the baler, means being provided upon the front end of the baler for connecting the machine to a tractor, further, the device consists of an improved form of platform supported upon one side of the baler and slightly forwardly of the conveyor whereby an attendant may advantageously view and assist in the operation of the baler.

With particular reference to the drawings, the machine comprises a desirable form of hay loader A having spaced connections with one side of the hay baler B, and an improved type of conveyor C supported upon the adjacent side of the baler beneath the outlet end of the loader. A platform D is also supported upon the adjacent side of the baler and slightly forwardly of the conveyor C for purposes described. A suitable form of connecting means is provided at the forward end of the baler whereby the machine may be pulled by a tractor E.

The conveyor between the baler and outlet end of the hay loader comprises a pair of longitudinally extending spaced side shields 1 and 2 with front and rear shafts 3 and 4, rotatably secured between the opposite ends thereof, these shafts supporting the opposite ends of a flooring 5. Mounted on the shafts 3 and 4 adjacent the ends thereof are the co-operating sprocket wheels 6 over which are trained the sprocket chains 7. Extending transversely across and supported at spaced points thereon are flights 8 contacting with the upper surface of the flooring 5 for moving the hay upwardly thereon when the shafts are rotated. With particular reference to Figure 5, it will be seen that one end of the forward shaft 3 projects externally of the side shield 2 and has keyed thereon a bevelled gear 9 for mesh with another bevelled gear 10 keyed to the adjacent end of a shaft 11 rotatable within a bearing 12. This bearing 12 has a bracket plate 13 formed thereon, which bracket plate is bolted to the adjacent outer end of the side shield 2 of the conveyor. The opposite end of this shaft 12 carries a sprocket wheel 14 for connections through the medium of a sprocket chain 15 engaging over a similar sprocket wheel upon the power shaft $b$ of the baler B.

The conveyor C is preferably disposed with respect to the baler B as to incline upwardly towards the outlet end thereof and to lie directly adjacent the hopper c thereof. Any desirable means may be employed for supporting the conveyor C at the outlet end thereof upon the baler, additional means being provided for centrally supporting this conveyor to the baler comprising a supporting arm 15, Figure 4, secured at its lower end to one of the lower channel irons 16 composing the frame work of the baler, the upper end of this arm 15 being riveted to the outer surface of the side shield 1 of the conveyor as shown in Figure 4. Additional means is provided for centrally supporting the conveyor at the opposite side thereof which consists of a depending bar 17 riveted to the outer side of the shield 2 of the conveyor and suitably connected at its lower end to the platform D.

The platform D comprises a pair of adjacent longitudinally extending planks 18, Figure 3, secured at the inner ends thereof to the bottom spaced angle irons 16 and 19 by bolt and nut connections 20. Adjacent the outer end of the platform and upon the bottom surface thereof, the same has riveted or otherwise suitably secured thereto an arm 21, the opposite ends of which project beyond the sides of the platform 10, and is connected at the rear end to the tongue 22 upon the front supporting axle 23 of the loader A. The forward projecting end of the arm 21 is secured to one end of a connecting bar 24, this bar being connected at its opposite end to the channel iron 16 of the baler frame.

In view of the above description it will be readily understood that I have disclosed an extremely simple and effective means for connecting a hay baler to a hay loader and have further provided a means for conveying the hay from the loader to the baler whereby when the loader and baler is conveyed by a tractor, the loader being connected in a line with a hay windrow, this hay will be effectively raked up by the raking arms of the loader and conveyed to the baler for baling the same, whilst the machine is in movement upon the field.

Minor changes may be made in the invention without departing from the spirit and scope thereof as claimed.

What I claim as new is:—

In combination, a hay loader including the front supporting axle therefor, a hopper, a supporting frame therefor, an interposed transverse conveyor, a transverse platform disposed in front of the conveyor and fixed to and extending laterally from the frame of the hopper, an arm fixed to the platform and spaced from the hopper, a bar connected at one end to one end of the arm and at its opposite end to the adjacent side of the hopper frame, a connection between the opposite end of the arm and the front supporting axle of the hay loader, a diagonal support between the lower portion of one side of the hopper frame and one side of the transverse conveyor, and an upright support between the platform and the opposite side of the transverse conveyor.

In testimony whereof I affix my signature.

CHARLES C. ROMIG.